May 24, 1966     J. L. ROMSTADT ETAL     3,252,829
METHOD OF PRODUCING TRANSPARENT ELECTRICALLY CONDUCTING
GLASS SHEETS AND ARTICLE RESULTING THEREFROM
Filed May 15, 1962

INVENTORS
Joseph L. Romstadt and
Richard A. Vascik
BY
Robbe & Swope
ATTORNEYS

United States Patent Office 3,252,829
Patented May 24, 1966

3,252,829
METHOD OF PRODUCING TRANSPARENT ELECTRICALLY CONDUCTING GLASS SHEETS AND ARTICLE RESULTING THEREFROM
Joseph L. Romstadt and Richard A. Vascik, Toledo, Ohio, assignors to Libbey-Owens-Ford Glass Company, Toledo, Ohio, a corporation of Ohio
Filed May 15, 1962, Ser. No. 194,925
12 Claims. (Cl. 117—211)

The present invention relates broadly to electrically conducting articles or articles comprising electrically conducting films on glass or other vitreous material, and more particularly relates to an improved method for producing such electrically conducting filmed articles.

This application is a continuation-in-part of copending application Serial No. 100,738, filed April 4, 1961, and now abandoned.

Although this invention is in no way restricted to electrically conducting films or coatings of any particular type or composition, or to their use with any particular kind of base or supporting surface, it is of particular utility in connection with transparent, electrically conducting films of tin oxide on glass sheets, and will be herein described in that connection.

Glass sheets coated with transparent, electrically conducting films of tin oxide on at least one of their surfaces and that are applied by exposing the sheet, while at a temperature approximating the softening temperature of the glass, to the action of a tin compound in fluid form, have come to be quite widely used in de-icing windows or windshields of aircraft as well as automotive land vehicles. In use, the electrically conducting film on the glass sheet is supplied with sufficient electric energy, through suitable electrodes secured to the sheet and in electrical contact with the film, to heat the same in its installed position to a temperature at which ice or frost will be removed from, or its formation prevented on the exposed surface of the glass sheet. With de-icing units of this character, electrodes are provided which extend along the marginal portions of the sheet that are adjacent the opposite edges of the filmed glass sheet; this arrangement creating a uniform temperature throughout the area of the film upon the application of the required amount of electrical energy to the electrodes.

However, during filming, the glass sheets that have been heated to softening temperature will be subjected to relatively rapid cooling if the filming solution is applied by syraying thereagainst. This results in a thermal change by reason of which the temperature of the sheet that has been so filmed on one side may be reduced below the temperature at which the glass can be suitably tempered by further chilling. While satisfactorily tempered, electrically conducting glass sheets have been obtained by the methods heretofore practiced, we have found that an improved strength and breaking pattern can be produced if the sheet is chilled to temper the same when at substantially the same temperature to which it was initially heated for filming.

This invention, moreover, contemplates a further improvement in the production of electrically conducting glass sheets by, first, eliminating an electrical resistance problem heretofore encountered in the areas of the film adjoining the oppositely disposed electrodes and, secondly, by greatly improving the structural or physical strength characteristics of the composite glazing unit incorporating such electrically conducting filmed glass sheets. Thus, with regard to the former, various efforts have been made to avoid the apparent change in the chemical structure or composition of the electrode material that takes place when it is covered with the metal oxide film-forming solution. In one way or another, the filming solution, later to be more fully described, reacts with the electrode material to form a filmed area having a composition differing from either the film-forming solution or the electrode material and with a lower conductivity which results in a high factor of electrical resistance. This creates intervening marginal areas which have been commonly described as "weak interfacial" areas.

It has heretofore been proposed to eliminate such weak interfacial areas by the provision of a metallic overlay, e.g., an air-dry silver, which overlay bridges the junction or meeting line of the film and the electrode. This overlay, normally comprising finely divided silver suspended in a lacquer vehicle, is brushed onto the unit and dries upon exposure to air, such method and resulting structure being more fully described in Gaiser Patent No. 2,628,299, issued February 10, 1953.

Now, while the structure according to the above-mentioned patent is satisfactory for many purposes, it has been found to lack the strength often necessary in the more modern jet aircraft glazings. In this connection, a filmed, electrically conducting glass sheet, when utilized as the outboard lite of a multiple sheet jet aircraft glazing, has its marginally disposed electrodes covered by the thermoplastic interlayer material which is also usually extended outwardly of the periphery of the glass sheets to form a mounting flange for the unit. Because of the substantial difference in the coefficients of thermal expansion of the thermoplastic material and the glass, electrode failure often results within the unit, usually accompanied and to some extent caused, by separation at the interfaces of the plastic and glass material and plastic and metal electrode material.

It has been proposed to eliminate this separation and resulting areas of electrode failure by the inclusion of a parting or separating layer disposed over the electrode between the glass and plastic interlayer and extending over a contiguous edge of the glass sheet, which layer enables a slight relative movement between the plastic and the glass in order to compensate somewhat for the difference in thermal expansion. However, it was discovered that such relative movement creates a rubbing effect which often is sufficient to remove the relatively weakly bonded overlay, or that the parting layer itself, which is often adhesively secured to the electrode and film, tends to pull the air-dry material disposed at the junction of the fused electrode with the electrically conducting film with it during the relative movement and thus cause a separation which results in electrical failure of the unit.

According to the present invention, after the conventional filming operation, the glass sheet is allowed to cool to room temperature after which a second layer of the fusible electrode material is applied over each of the original electrodes and over the junction therewith with the electrically conducting film and the sheet again heated to a softening temperature to fuse the second electrode layer. In this manner, an extremely strong bond is obtained between the electrodes and the glass sheet since the second electrode material is, in fact, fired into the sheet itself as well as being integrally fused and united with the first electrode. It has also been observed, and most importantly, that with the employment of a second fused electrode, no tendency toward chemical reaction between such electrode and the parting material, or in the event such is not used, the mounting flange or interlayer extension, both of which, for example, may be composed of a synthetic resin or Thiokol and thus contain various solvents, appears to occur as believed to sometimes be the case with the use of an air-dry silver overlay. Thus, the structure in accordance with this invention has been found to essentially provide a solution to all of the major problems presently found to exist in high speed aircraft glazing units, being structurally sound as well as eliminating electrically interfacial weak areas at the junction of the conducting film and first electrode.

It is here believed noteworthy to mention that it is not necessary for all glass sheets possessing an electrically conducing layer on one surface to be subsequently tempered following the filming operation. For certain purposes, an annealed electrically conducting glass sheet has been found to be entirely satisfactory. Accordingly, and following the second heating of the glass sheet, it can be again cooled either slowly or rapidly depending on the characteristics desired in the finished product.

In the latter case, the glass sheet, after application of the second layer of electrode material and reheating the sheet to substantially its softening point, is passed between the blower heads of a tempering apparatus and the sheet is tempered by subjecting its opposite sides to blasts of cooling air. The resulting sheet will be found to possess an improved temper while at the same time, the problems of a high resistance interface between the electrically conducting film and the electrodes and poor strength characteristics of the electrodes themselves will be eliminated.

It is therefore a primary object of this invention to provide an improved method of producing an electrically conducting article including a vitreous sheet and an electrically conducting film on a surface thereof and then tempering the same whereby the filmed and tempered sheet will possess a more uniform strain pattern.

Another object of the invention is to provide a filming method which includes providing one surface of the glass sheet with narrow marginal edge layers of fusible electrode material and an electrically conducting film and subsequently with a second marginal edge layer of fusible electrode material which at least covers the junction of the first electrode material with the film to overcome the problem of high interfacial resistance in such articles and greatly improve the strength characteristics thereof.

Other objects and advantages of the invention will become more apparent during the course of the following description when read in connection with the accompanying drawings.

In the drawings wherein like numerals are employed to designate like parts throughout the same:

Figure 1:
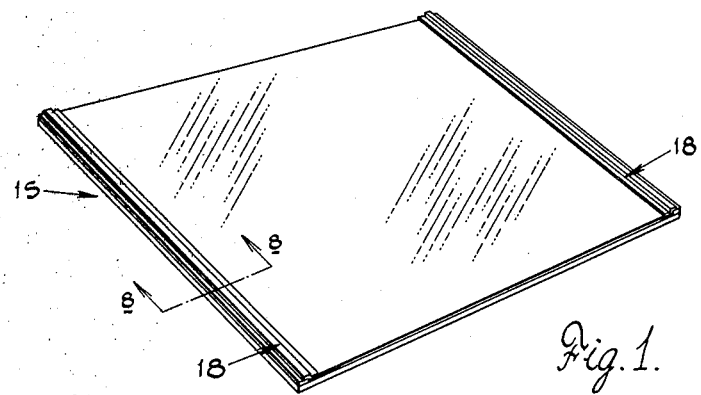
FIG. 1 is a perspective view of an electrically conducting glass sheet produced by the method of the present invention.

Referring now more particularly to the drawings, there is shown in FIG. 1 an electrically conducting article or panel 15 comprising a sheet of glass 16 provided on one surface with an electrically conducting film 17 of relatively low resistivity and with electrodes arranged along the oppositely disposed margins of the sheet and generally designated by the numeral 18. While each electrode appears to be formed in two discrete layers, it should be initially pointed out that this manner of illustration is merely to clearly show the novel features of the invention since, as will be later more fully described, each of the electrodes of the finished electrically conducting glass sheet is an integral layer of one and the same material.

Figures 6, 8, 9:
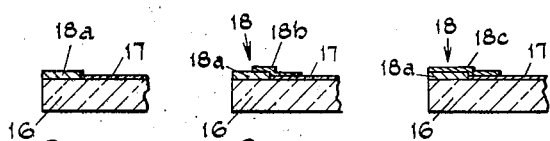
FIG. 6 is a fragmentary sectional view of one margin of a partially completed glass sheet.
FIG. 8 is a fragmentary sectional view taken substantially along the line 8—8 of FIG. 1.
FIG. 9 is a fragmentary sectional view illustrating the electrode arrangement according to a further embodiment of the invention.

In carrying out the production of an electrically conducting article according to the invention, the surface of the glass sheet to be filmed is carefully cleaned and an electrode-forming material is applied along oppositely disposed marginal portions thereof in a first layer 18a of relatively narrow width and thickness (FIG. 6). A number of different materials may be used for the electrodes 18 which are ordinarily arranged along opposite marginal portions of the glass sheet. For example, electrodes of sprayed copper, sprayed copper alloys, gold, silver and platinum fluxes and combinations of these materials have all been used satisfactorily. However, fired-on silver flux is preferred for the electrodes and may be made up of 65.6 percent silver, 7.8 percent flux, 18 percent organic liquid binder and 8.54 percent thinner, these percentages being in percent by weight. This material is applied by brushing or rolling it on two opposite marginal portions of the glass sheets, after which the sheet is heated, preparatory to the filming operation, and results in fusion of the silver flux onto the glass.

Figure 2:
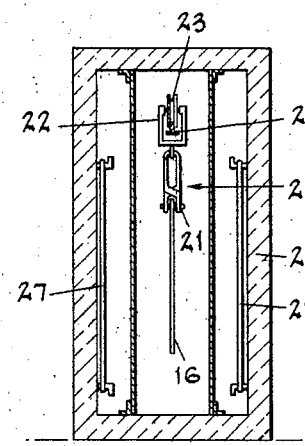
FIG. 2 is a vertical, transverse section through a furnace in which glass sheets are heated.
Figure 3:
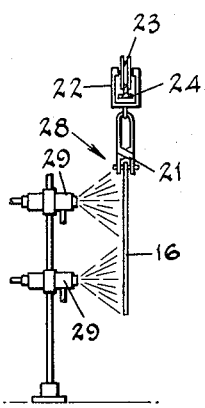
FIG. 3 is an end elevation of a filming apparatus.
Figure 5:
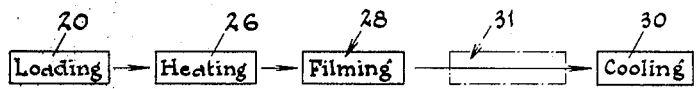
FIG. 5 is a flow sheet type diagram illustrating the operations employed in one step of the invention.

A properly cleaned sheet of glass 16 in the loading area 20 of FIG. 5 is suspended at its upper edge from tongs 21, hung from a carriage 22 which is movably supported by wheels 23 traversing a monorail 24. The carriage 22 is moved along the monorail 24 (by means not shown) to carry the glass sheet 16 first into the heating zone or chamber 25 of a furnace 26 (FIG. 2).

The furnace 26 may be heated in any suitable manner, such as by means of electric resistance heaters 27, to bring the body of the glass sheet to the desired temperature in a heating atmosphere of substantially uniform temperature. With soda-lime-silica glass it is customary to heat the glass for about two minutes at approximately 1200° F., during which time the carriage 22 may be moved slowly through the heating chamber 25 of the furnace. When the carriage 22 and properly heated glass sheet 16 are removed from the heating chamber, they are moved immediately (by means not shown) along the monorail 24 into the filming area 28. Here, guns 29 direct a filming solution capable of forming a transparent metal oxide film on one surface of the glass sheet until a layer of uniform thickness is obtained.

One of the commonly used materials in the formation of a transparent, electrically conducting film on a glass sheet is a tin halide dissolved in a suitable solvent. For example, tin chloride in an organic solvent may be employed in a spray solution of 10 percent stannic tetrachloride in 90 percent isopropyl alcohol to provide a transparent film of the desired resistivity. Furthermore, anhydrous stannic chloride in liquid or vapor form may be sprayed in this manner. In addition, other tin salts such as stannous chloride, stannic iodide and stannic fluoride as well as salts of other metals which are capable of producing transparent electroconductive coatings (cadmium chloride or bromide, zinc acetate or bromide, indium triiodide, titanium tetrachloride, etc.) may be used.

It should also be noted that the glass sheet 16 may be carried slowly past the spray guns 29 during continuous movement of the carriage 22 through the filming area, or the guns may be mounted on a movable support and reciprocated back and forth relative to the sheet while it is momentarily halted. When the desired thickness of film 17 has been obtained, the carriage 22 with the filmed sheet 16 is moved further along the monorail to an area indicated at 30 in FIG. 5 wherein the temperature of the glass sheet is slowly reduced whereby the body of the sheet can be cooled in normal room atmospheres.

It is now found that, in many instances, the areas of the film 17 along the inner edges of the electrode material 18a will have combined with the material thereof to create an interim area believed to consist of silver chloride and having a higher resistance than either the electrode silver-frit material or the tin oxide film. This creates an unfavorable condition in the expected satisfactory use of the electrically conducting glass sheet since there will be weak interfacial areas wherein hot spots can develop upon application of electrical currents with eventual failure of the conducting film in such areas.

To reduce, if not entirely eliminate, this situation, when the glass sheet 16 has cooled and can be readily handled, a second layer of the fusible, electroconductive metal-containing flux material, e.g. silver flux, is applied in a stripe 18b, as shown in FIG. 8, and covers at least the junction of the layer 18a with the tin oxide film 17.

Figure 7:
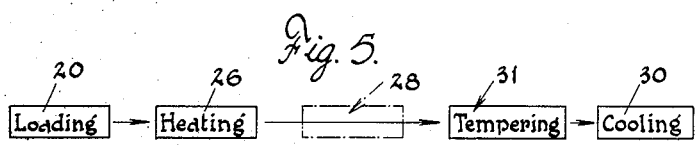
FIG. 7 is a flow sheet type diagram illustrating the operations employed in a second step of the invention.

The sheet 16 is again suspended from a carriage 22 and, as in FIG. 7, is advanced from the loading area 20 into the heating chamber 25 of the furnace 26 wherein the body of the glass is again raised to a softening temperature. And, as in carrying out the first phase of the method, during such second heating operation, the silver-flux layer 18b is fused onto the glass. However, in the present instance, in this fusing operation, the second layer 18b not only unites integrally with the base layer 18a and sheet 16 but covers the adjoining area of the tin oxide film 17. This adequately spans any possible area wherein an unfavorable electrical resistance problem might develop.

Figure 4:
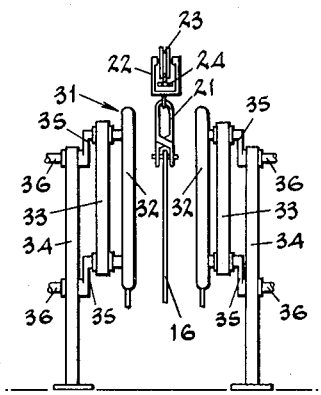
FIG. 4 is an end elevation of a tempering apparatus.

When the softening temperature of the glass sheet has been reached, such temperature is also within a thermal range at which a very good tempered strain pattern will develop when the sheet is subjected to the blasts of cooling air. Alternatively, as mentioned above, the glass sheet after the second heating thereof can be allowed to cool slowly and thus afford an electrically conducting glass sheet with good annealed properties and which is usable for certain subsequent processing operations. However, where a tempered glass sheet is desired, the carriage 22 is moved forwardly along the monorail 24 into an area designated by the numeral 31 in FIGS. 4 and 7. The apparatus in this particular area includes a pair of blast heads 32 carried by frames 33 that are rotatably supported on bases 34. The frames 33 are provided with cranks 35 adapted to be rotated by either of the shafts 36 to the end that the blast heads 32 will be carried through a circular pattern to full sweep both surface areas of the sheet. Alternatively, the sheet can be moved slowly by the carriage between the opposed blast heads 32 which would then remain stationary.

The important fact here to be mentioned is that there will be no appreciable loss of heat in the body of the glass from the time that it leaves the furnace 26 until it is positioned in the tempering area 31. For this reason, in FIG. 5, the area normally occupied by the tempering apparatus is indicated in broken line, whereas the filming apparatus in the area 28 is indicated in broken line in FIG. 7. In other words, there is no structural change in the arrangement of a complete apparatus for producing electrically conducting glass but rather a preferred rearrangement in the operational phases in which the filming operation and the tempering operation are carried into effect.

FIG. 9 illustrates an alternative embodiment of the invention wherein a second electrode layer 18c is applied in a wider strip so as to completely cover the base electrode layer 18a as well as the junction thereof with the electrically conducting film 17. It has been found that this structure provides for optimum electrical and strength properties in the glazing unit incorporating same and it is particularly used to advantage where large areas are to be protected from, for example, frost or ice formation, thereby necessitating somewhat higher electrical currents.

Thus, in carrying out the method of the present invention, improved electrodes 18 are provided on the oppositely disposed marginal portions of the electrically conducting glass sheet 15. This is made possible by the repeated application of the silver-flux in a layer sufficient to cover any adjoining area of the film which might otherwise have been converted into an area of higher resistance by the change in chemical composition. Additionally, since the heated glass sheet, during the filming thereof, will lose a certain amount of its high heat, it is cooled and then reheated to a softening temperature which is compatible with the range of high temperature at which a good and uniform strain pattern will be produced.

It is to be understood that the form of the invention herewith described is to be taken as an illustrative embodiment only of the same, and that various procedural changes may be resorted to without departing from the spirit of the invention.

We claim:

1. A method of producing transparent electrically conducting glass sheets, comprising applying a first layer of a fusible electroconductive metal-containing glass flux along at least one marginal portion of one surface of a glass sheet, said flux having a fusing temperature which is lower than the softening temperature of the glass sheet, heating said sheet to a temperature approaching the softening temperature of the glass to fuse said first flux layer to the glass, applying an electrically conducting metal oxide film-forming material to said one surface of the heated glass sheet to film same, applying a second layer of a fusible electroconductive metal-containing glass flux over at least a portion of said first flux layer and the interface thereof with said electrically conducting film, the fusing temperature of said second flux layer also being lower than the softening temperature of the glass sheet, and then reheating the filmed sheet to a temperature approaching the softening temperature of the glass to fuse said second flux layer in place.

2. A method of producing transparent electrically conducting glass sheets as defined in claim 1, in which the film-forming material is a solution of a metal salt which upon contact with the heated glass sheet forms the oxide of such metal and the reheated sheet is cooled under controlled conditions.

3. A method of producing transparent electrically conducting glass sheets as defined in claim 2, in which the temperature of the reheated sheet is slowly reduced to anneal the same.

4. A method of producing transparent electrically conducting glass sheets as defined in claim 2, in which the reheated sheet is rapidly chilled to temper same.

5. A method of producing transparent electrically conducting glass sheets as defined in claim 1, in which said second layer of fusible electroconductive metal-containing flux is applied completely over said first flux layer and the interface thereof with said electrically conducting film.

6. A method of producing a transparent electrically conducting glass sheet which comprises applying a first layer of a silver and glass flux material to oppositely disposed marginal portions of a surface of a glass sheet, heating said sheet to substantially the softening temperature of the glass, exposing said surface to the action of a tin compound in solution to form an electrically conducting tin oxide film thereon, applying a second layer of a silver and glass flux material over at least a portion of said first flux layer and the interface thereof with said electrically conducting film, and then reheating the filmed sheet to substantially the softening temperature of the glass to fuse said second silver flux layer in place.

7. A method of producing a transparent electrically conducting glass sheet as defined in claim 6, wherein both said first and second silver and glass flux materials comprise substantially 65.6 percent by weight silver, 7.8 percent by weight flux, 18 percent by weight organic binder, and 8.5 percent by weight thinner.

8. A method of producing a transparent electrically conducting glass sheet as claimed in claim 6, in which said second layer of silver and glass flux material is applied completely over said first layer and the interface thereof with said electrically conducting film.

9. A method of producing a transparent electrically conducting glass sheet as claimed in claim 6, in which both surfaces of the reheated sheet are subjected to blasts of cooling air to temper same.

10. A method of producing transparent electrically conducting glass sheets, comprising applying a layer of a fusible electroconductive metal-containing glass flux along at least one marginal portion of one surface of a glass sheet, said flux having a fusing temperature which is lower than the softening temperature of the glass sheet, heating said sheet to a temperature approaching the softening temperature of the glass to fuse said flux layer thereto, applying an electrically conducting metal oxide film-forming material to said one surface of the heated glass sheet to film the same, reheating the filmed sheet to substantially the softening temperature of the glass, and then subjecting the surfaces of the reheated sheet to blasts of cooling air.

11. A transparent electrically conducting glass sheet produced in accordance with the method of claim 1.

12. A transparent electrically conducting glass sheet produced in accordance with the method of claim 4.

References Cited by the Examiner

UNITED STATES PATENTS

| | | | |
|---|---|---|---|
| Re. 23,556 | 9/1952 | Mochel | 117—212 |
| Re. 25,651 | 10/1964 | Young | 117—212 |
| 2,569,773 | 10/1951 | Orr | 117—212 |
| 2,592,601 | 4/1952 | Raymond et al. | 117—211 |
| 2,628,299 | 2/1953 | Gaiser | 117—212 |
| 2,648,754 | 8/1953 | Lytle | 117—211 |
| 2,730,598 | 1/1956 | Lytle | 117—211 |
| 2,825,687 | 3/1958 | Preston et al. | 117—211 |
| 2,882,377 | 4/1959 | Rinehart | 117—211 |
| 2,954,454 | 9/1960 | Gaiser | 117—211 |
| 2,959,493 | 11/1960 | Vincent | 117—119.2 |
| 3,012,924 | 12/1961 | Browne | 117—211 |
| 3,107,177 | 10/1963 | Saunders et al. | 117—211 |

FOREIGN PATENTS 757,782  9/1956  Great Britain.

RICHARD D. NEVIUS, *Primary Examiner.*

JOSEPH B. SPENCER, *Examiner.*